H. J. M. SCHAAB.
UTENSIL.
APPLICATION FILED MAR. 1, 1913.
1,073,528.
Patented Sept. 16, 1913.
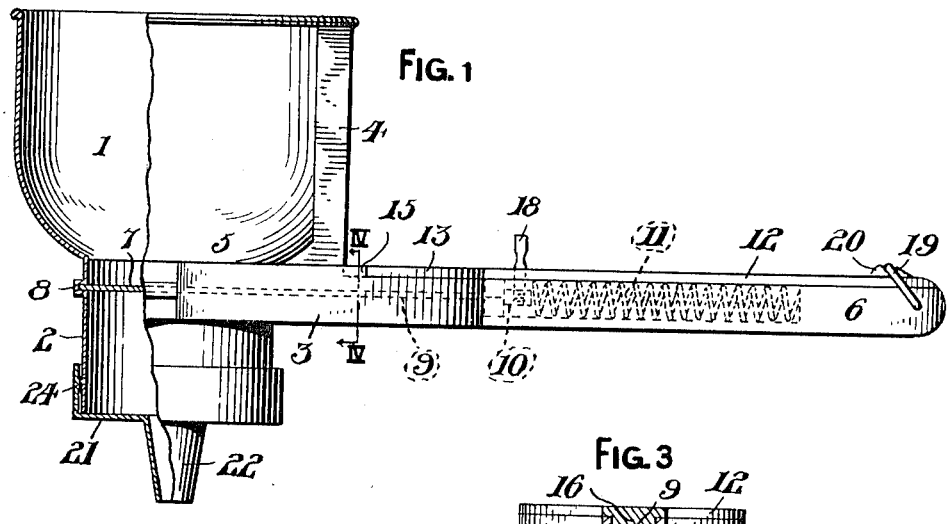
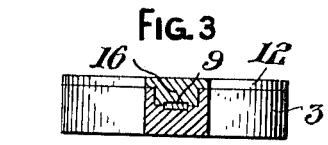
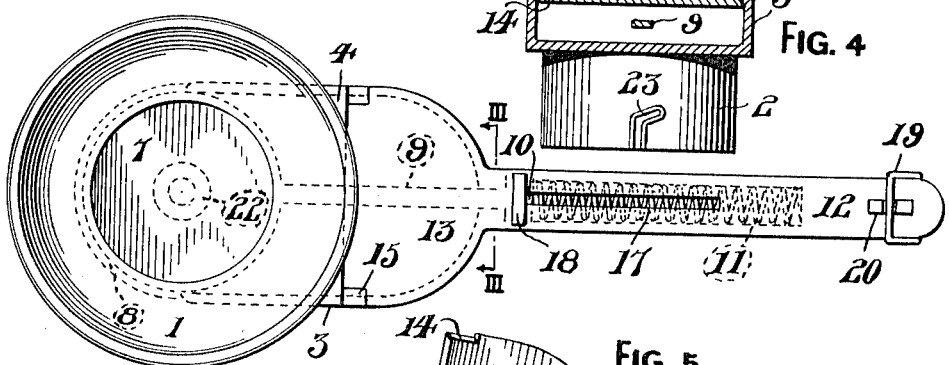
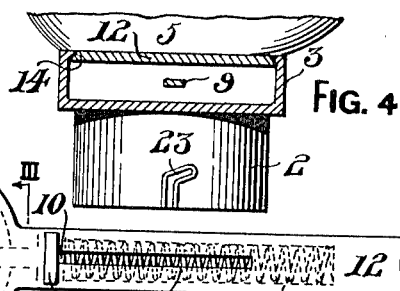
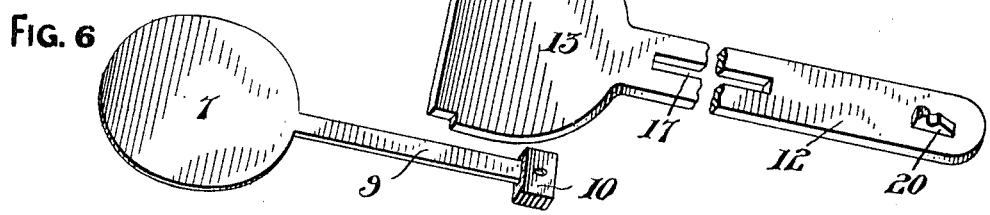
WITNESSES
INVENTOR
Herman J. M. Schaab
ATTORNEY

UNITED STATES PATENT OFFICE.

HERMAN J. M. SCHAAB, OF MILLVALE, PENNSYLVANIA.

UTENSIL.

1,073,528.   Specification of Letters Patent.   Patented Sept. 16, 1913.

Application filed March 1, 1913. Serial No. 751,456.

*To all whom it may concern:*

Be it known that I, HERMAN J. M. SCHAAB, a citizen of the United States of America, residing at Millvale, in the county of Allegheny and State of Pennsylvania, have invented certain new and useful Improvements in Utensils, of which the following is a specification, reference being had therein to the accompanying drawing.

This invention relates to utensils, and the primary object of my invention is to provide a utensil that can be used as a dipper, measure, funnel and depositing device.

Another object of this invention is to provide a combined measure and funnel that can be advantageously used in a culinary department for filling bottles and other receptacles.

A further object of this invention is to provide a depositing device that can be used in bakeries and confectionery establishments for economically and expeditiously depositing icing, marshmallow and other ingredients upon cakes, cookies, candies and other bakery and confection products.

A still further object of this invention is to provide a utensil of the above type consisting of comparatively few parts that are easily and quickly assembled, maintained in a sanitary condition, manufactured at a comparatively small cost, and highly efficient for the purposes for which they are intended.

With the above and other objects in view, the invention resides in a novel construction, combination and arrangement of parts to be hereinafter specifically described and then claimed.

Reference will now be had to the drawing, wherein:—

Figure 1 is a side elevation of the utensil partly broken away and partly in section. Fig. 2 is a plan of the same. Fig. 3 is a cross sectional view taken on the line III—III of Fig. 2. Fig. 4 is a similar view taken on the line IV—IV of Fig. 1. Fig. 5 is a perspective view of a portion of a detached cover or handle plate, and Fig. 6 is a perspective view of a detached slide or valve forming part of the utensil.

Further describing my invention in detail with reference to the drawing wherein like numerals denote corresponding parts throughout: 1 denotes a cup or funnel shaped receptacle that has the bottom thereof provided with an integral cylindrical spout 2.

3 denotes a horizontal slide casing that is formed integral with the rear side of the spout 2 and the top of said casing is connected to the receptacle 1 by vertical ribs 4 and fillers or enlargements 5. The slide casing 3 protrudes from the rear side of the spout 2 and terminates in a hollow integral handle 6 that has the top thereof open. The slide casing 3 is in communication with the spout 2 and slidably mounted in said casing is a circular slide or a gate valve 7 adapted to close a spout 2 by extending into a semi-circular groove or seat 8 forming part of the spout 2. The slide or valve 7 has a stem 9 that extends into the handle 6 and is provided with a slide head 10.

11 denotes a coiled compression spring located within the handle 6 between the end thereof and the slide head 10, and the tension of this spring is sufficient to hold the slide or valve 7 normally closed relatively to the spout 2.

12 denotes a handle plate having a semi-circular cover 13 for the slide casing 3. The cover 13 has the side edges thereof cut away and beveled as at 14 and the beveled edges of said cover are adapted to engage under beveled lugs 15, carried by the side walls of the casing 3, the lower ends of the vertical ribs 4. The handle of plate 12, at the edge of the cover 13, is provided with a depending guide 16 that fits within the handle 6 and guides the stem 9 of the slide or valve 7. This is best shown in Fig. 3. The handle 12, adjacent to the cover 13 has a longitudinal slot 17 and this slot provides clearance for the shank of a finger piece 18, said finger piece having the shank thereof mounted in the slide head 10, whereby the slide or valve 7 can be easily shifted to an open position by the same hand that grips the handle 6.

19 denotes a pivoted link or clip carried by the inner end of the handle 6 and this link can be swung upwardly over the handle plate 12 to engage a notch keeper 20 carried by said handle plate. The keeper 20 and the link 19 constitute means for detachably holding the handle plate upon the handle 6, and said means coöperate with the edge of the cover 13 in retaining a closure upon the slide casing 3 and the handle 6.

21 denotes a detachable cap located upon the lower end of the spout 2 and this cap is provided with a depending nipple 22 of such size as to readily fit in the neck of a bottle, jug or other receptacle. For detachably holding the cap 21 upon the lower end of the spout 2, I resort to a bayonet connection, wherein diametrically opposed sides of the spout 2 are provided with angle grooves 23 to receive inwardly projecting protuberances 24, carried by the inner walls of the cap 21.

With the slide or valve 7 closed, as shown in Fig. 1, the utensil can be used as an ordinary dipper or as a measure and when it is desired to deposit the contents of the receptacle 1, it is only necessary to shift the finger piece 18, at which time the entire contents or a portion of the contents of the receptacle 1 can be discharged through the spout 2 or the nipple 22, when the cap 21 is attached to said spout.

The utensil in its entirety can be made of light and durable metal and the construction of the same permits of it being maintained in a sanitary condition.

It is thought that the operation and utility of the utensil will be apparent without further description, and while in the drawing there is illustrated a preferred embodiment of the invention, it is to be understood that the structural elements are susceptible to such changes, as in the size, shape and manner of assemblage, as fall within the scope of the appended claims.

What I claim is:—

1. A utensil comprising a receptacle formed with a spout, a horizontally disposed slide casing projecting from said spout, vertical ribs connecting said casing to said receptacle, a handle projecting from said casing, a handle plate mounted upon said handle and formed with a cover closing the top of the casing, a slide valve arranged in said spout for closing the same and provided with a stem extending through the casing and into said handle, said stem having a head arranged in the handle, a spring controlled element within said handle for maintaining the valve closed, and a finger piece connected to said head and slidable upon the upper face of said plate.

2. A utensil comprising a receptacle formed with a spout, a horizontally disposed slide casing projecting from said spout, vertical ribs connecting said casing to said receptacle, a handle projecting from said casing, a handle plate mounted upon said handle and formed with a cover closing the top of the casing, a slide valve arranged in said spout for closing the same and provided with a stem extending through the casing and into said handle, said stem having a head arranged in the handle, a spring controlled element within said handle for maintaining the valve closed, a finger piece connected to said head and slidable upon the upper face of said plate, and a stem guide carried by said plate and depending in said handle.

In testimony wherof I affix my signature in the presence of two witnesses.

HERMAN J. M. SCHAAB.

Witnesses:
KARL H. BUTLER,
MAX H. SROLOVITZ.

---

Copies of this patent may be obtained for five cents each, by addressing the "Commissioner of Patents, Washington, D. C."